(12) United States Patent
Popov

(10) Patent No.: US 12,247,949 B2
(45) Date of Patent: Mar. 11, 2025

(54) APPARATUS AND METHOD FOR PIPELINE INSPECTION USING EMAT GENERATED SHEAR WAVES

(71) Applicant: J. van Beugen Beheer B.V., Hellevoetsluis (NL)

(72) Inventor: Sergey Popov, Hellevoetsluis (NL)

(73) Assignee: P & L PIPE SURVEY B.V., Hellevoetsluis (NL)

( * ) Notice: Subject to any disclaimer, the term of this patent is extended or adjusted under 35 U.S.C. 154(b) by 422 days.

(21) Appl. No.: 17/612,626

(22) PCT Filed: May 20, 2020

(86) PCT No.: PCT/EP2020/064143
§ 371 (c)(1),
(2) Date: Nov. 19, 2021

(87) PCT Pub. No.: WO2020/234394
PCT Pub. Date: Nov. 26, 2020

(65) Prior Publication Data
US 2022/0221429 A1 Jul. 14, 2022

(30) Foreign Application Priority Data
May 21, 2019 (NL) ..................................... 2023174

(51) Int. Cl.
*G01N 29/04* (2006.01)
*G01N 29/24* (2006.01)
(Continued)

(52) U.S. Cl.
CPC ....... *G01N 29/043* (2013.01); *G01N 29/2412* (2013.01); *G01N 29/265* (2013.01);
(Continued)

(58) Field of Classification Search
CPC ............. G01N 29/043; G01N 29/2412; G01N 29/265; G01N 29/4445; G01N 29/11;
(Continued)

(56) References Cited

U.S. PATENT DOCUMENTS

| 4,218,924 A | 8/1980 | Fortunko et al. |
| 4,289,030 A * | 9/1981 | Alers ..................... G01N 29/11 228/104 |
| 5,619,423 A * | 4/1997 | Scrantz .............. G01N 29/4463 324/229 |
| 5,760,307 A * | 6/1998 | Latimer .................... B06B 1/04 73/598 |
| 5,907,100 A * | 5/1999 | Cook ................... G01N 29/2412 73/622 |
| 6,282,964 B1 * | 9/2001 | Hancock .............. G01N 29/223 73/622 |

(Continued)

*Primary Examiner* — Jacques M Saint Surin
(74) *Attorney, Agent, or Firm* — David P. Owen; Hoyng Rokh Monegier B.V

(57) ABSTRACT

A method and apparatus for detecting and classifying cracks in pipelines is disclosed. The method for detecting and classifying cracks comprises the steps of: emitting a first shear wave along a region of inspection, the first shear wave being polarized in a first direction; receiving the first shear wave; emitting a second shear wave along the region of inspection, the second shear wave being polarized in a second direction at a minimal angle of about 10° different from the first direction, preferably at an angle of about 30° or more; receiving the second shear wave; examining the anisotropy of the first and second received shear waves by comparing at least one wave property of said first and second received shear wave for detecting and classifying cracks in the region of inspection. Said apparatus as disclosed herein comprises emitting and receiving EMATs, and is configured to carry out said method.

19 Claims, 12 Drawing Sheets

(51) Int. Cl.
*G01N 29/265* (2006.01)
*G01N 29/44* (2006.01)

(52) U.S. Cl.
CPC ............ *G01N 29/4445* (2013.01); *G01N 2291/023* (2013.01); *G01N 2291/0422* (2013.01); *G01N 2291/105* (2013.01); *G01N 2291/2636* (2013.01)

(58) Field of Classification Search
CPC ............ G01N 29/14; G01N 29/4409; G01N 2291/015; G01N 2291/0234; G01N 2291/0289; G01N 2291/044; G01N 2291/0422; G01N 2291/023; G01N 2291/2636; G01N 2291/105
USPC .......................................................... 73/628
See application file for complete search history.

(56) References Cited

U.S. PATENT DOCUMENTS

| | | | |
|---|---|---|---|
| 7,697,375 | B2 | 4/2010 | Reiderman et al. |
| 7,819,010 | B2 | 10/2010 | Alers et al. |
| 8,201,454 | B2 * | 6/2012 | Paige .................. G01N 29/2412 73/623 |
| 8,479,577 | B2 * | 7/2013 | Ganin .................. G01N 29/225 73/623 |
| 9,201,045 | B2 * | 12/2015 | Jamoussi ............... G01N 27/82 |
| 11,103,216 | B2 * | 8/2021 | Bercoff .................. A61B 8/485 |
| 11,631,338 | B2 * | 4/2023 | Pu ............................ G09B 7/04 434/322 |
| 2007/0211572 | A1 | 9/2007 | Reiderman et al. |
| 2011/0041612 | A1 | 2/2011 | Paige |
| 2011/0167914 | A1 | 7/2011 | Sutherland |
| 2014/0028300 | A1 | 1/2014 | Jamoussi et al. |

* cited by examiner

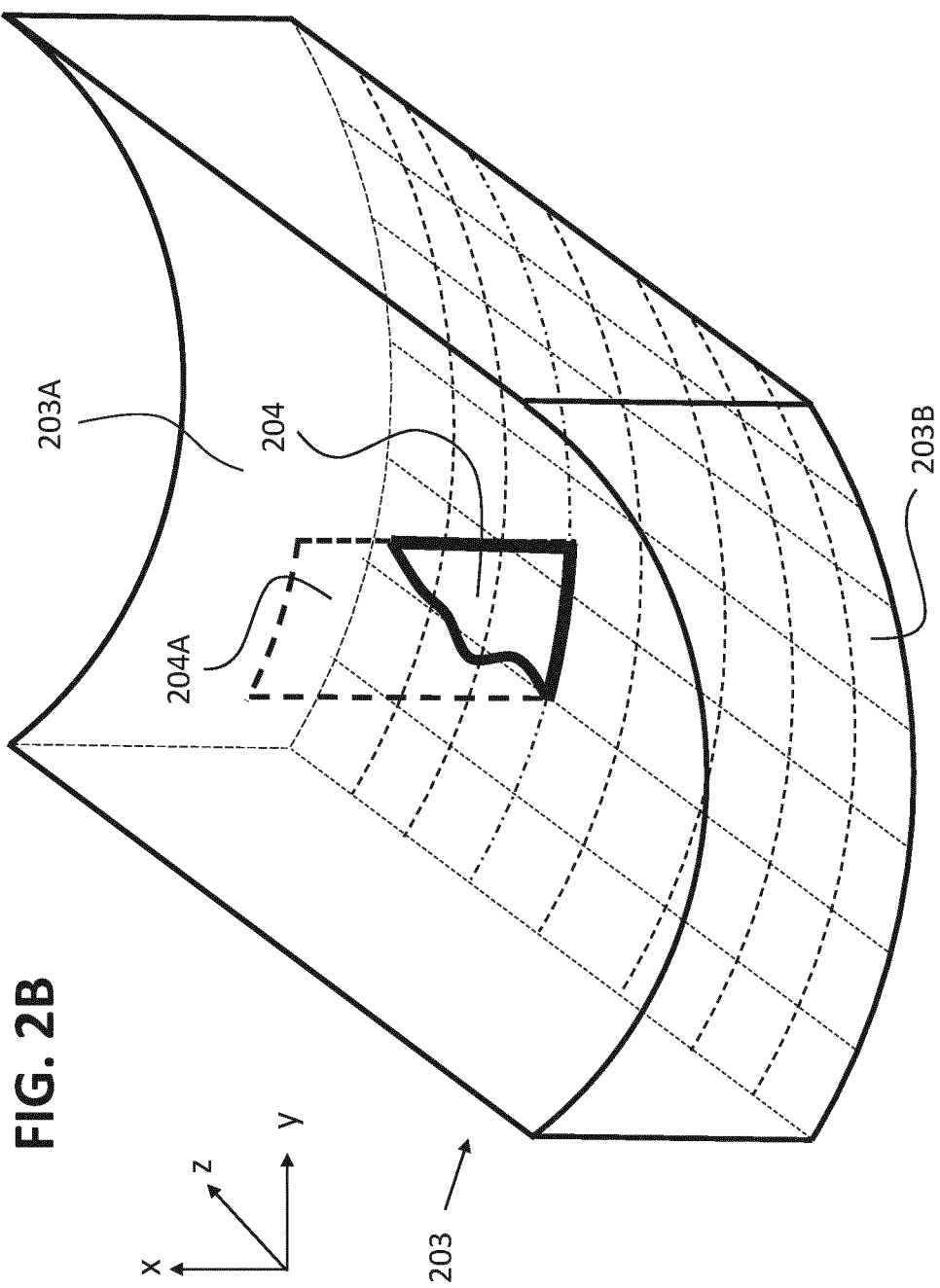

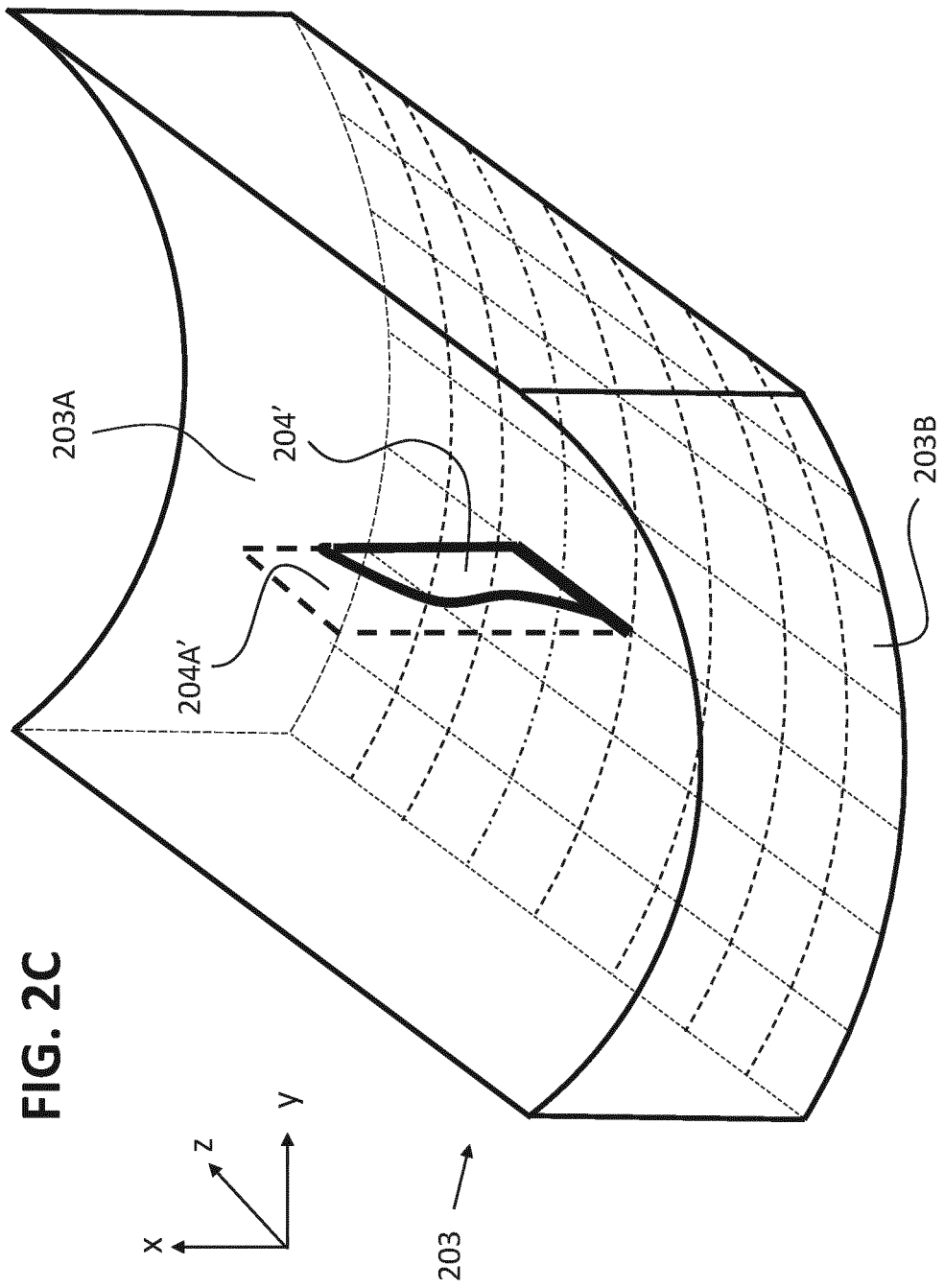

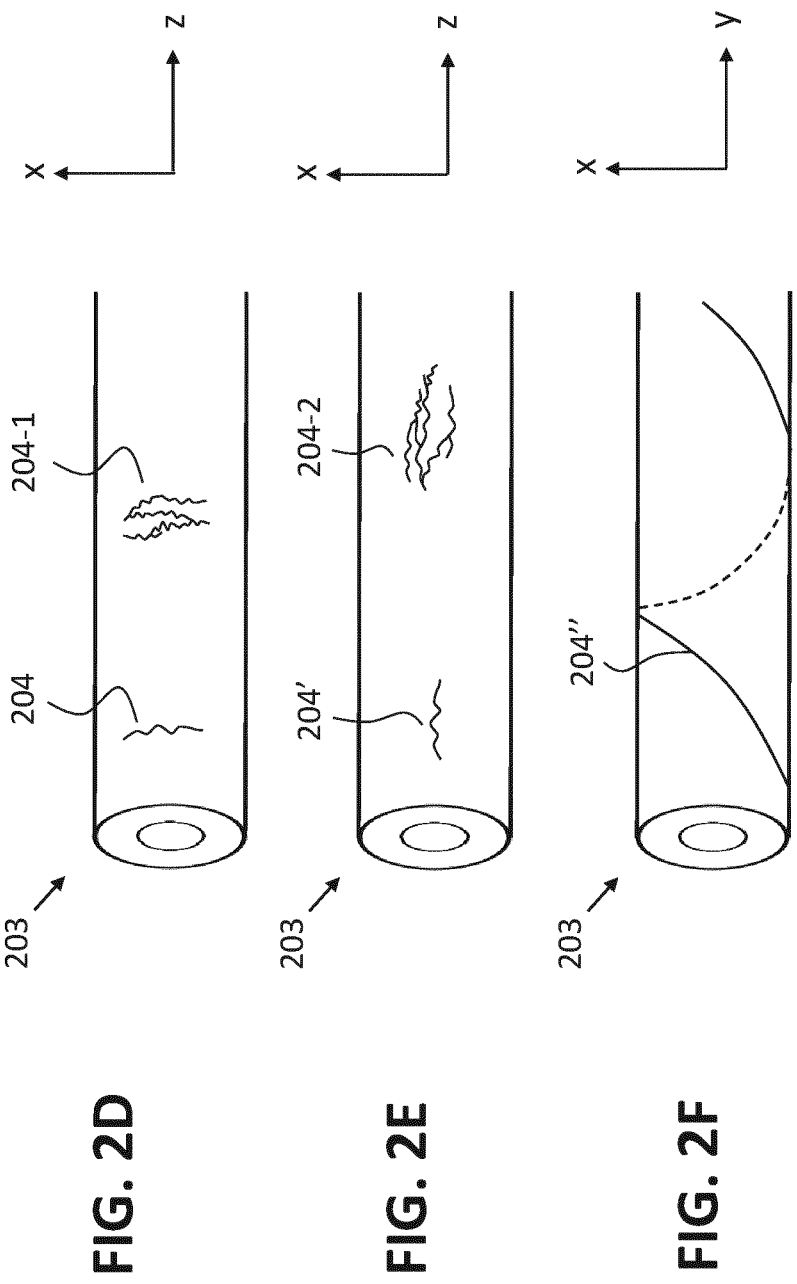

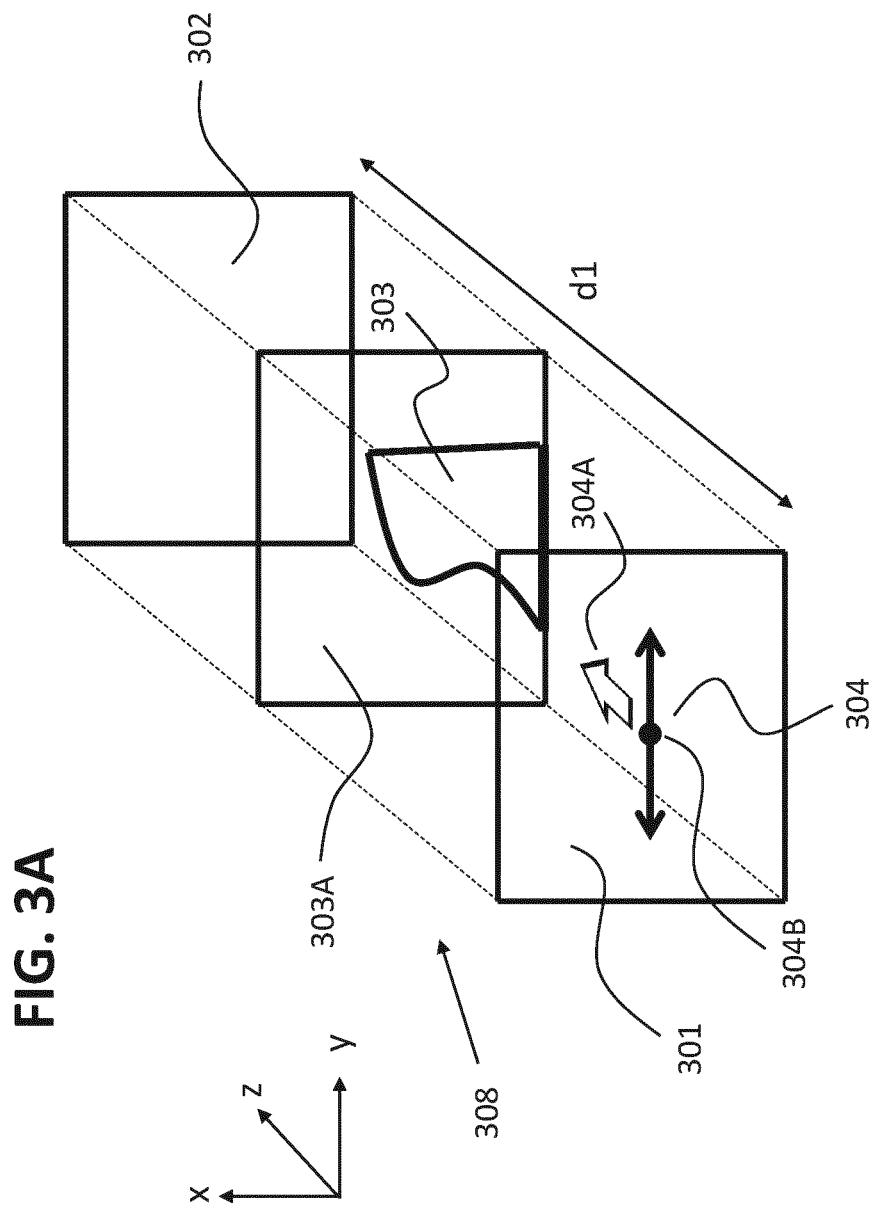

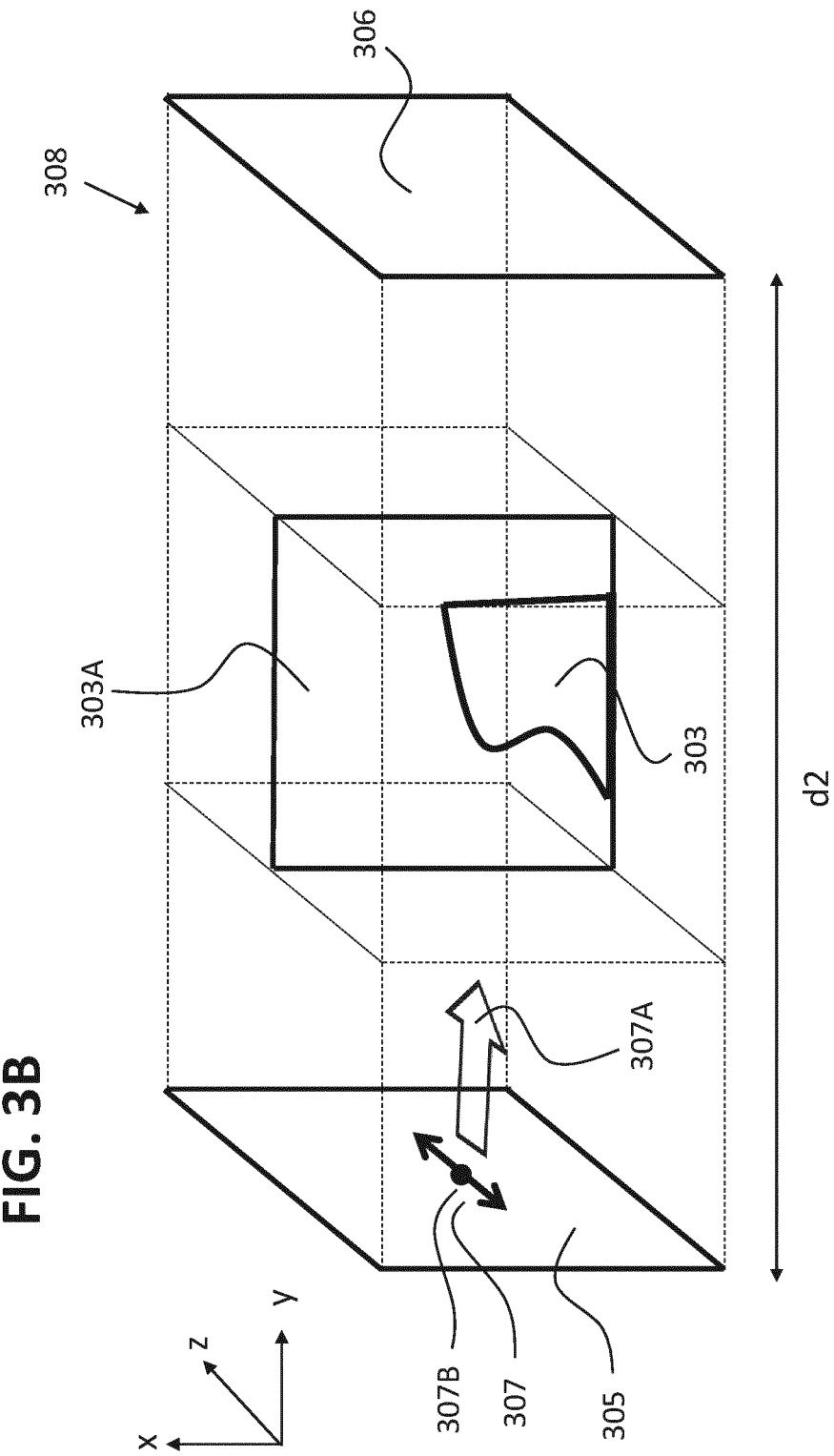

APPARATUS AND METHOD FOR PIPELINE INSPECTION USING EMAT GENERATED SHEAR WAVES

CROSS REFERENCE TO RELATED APPLICATIONS

This application claims priority from NL application number 2023174 filed on 21 May 2019, the contents of which are hereby incorporated by reference in their entirety. This application is based on international application no. PCT/EP2020/064143 which was published under PCT Article 21(2) in English, the contents of which are hereby incorporated by reference in their entirety.

FIELD OF THE INVENTION

The present application relates to a method for detecting and classifying cracks in a pipeline for liquid or gas. The present application further relates to an apparatus for inspecting a pipeline for the presence of cracks.

BACKGROUND OF THE INVENTION

Worldwide there are approximately 4,000,000 km of transportation pipelines for liquids and gas. Operators maintain an inspection and rehabilitation program to assess the integrity of these pipelines to guarantee a safe operation within economically determined parameters.

The most widely used method to conduct pipeline inspection on buried long-distance pipelines is by means of so-called 'intelligent pigging' or 'in-line inspection' using intelligent pigs. Intelligent pigs are instruments that are equipped with sensors which collect information about pipeline geometry and defects, that may include pipeline cracks deformation, corrosion, and disbonded coatings. These tools are autonomous and generally contain a board-computer, power supply and sensors. The image data which is acquired by these tools is in general downloaded upon retrieval of the tool for analysis. For short pipelines like loading pipes or risers, tethered pigs are used in general.

Known techniques to conduct intelligent pigging are based on Magnetic Flux Leakage (MFL) and Ultrasonic Transducers (UT).

MFL tools use magnetization for detection of most types of corrosion defects in a pipeline. The detection of such defects is based on a wall-thickness measurement of the pipeline. However, cracks in pipeline walls as caused by stress-corrosion cracking cannot reliably be detected by MFL tools. A crack or bundle of cracks usually start at the surface of the inner or outer wall of a pipeline and penetrate to a certain depth. Cracks in pipelines and welds are a serious concern, since cracks may lead to leakage problems or even sudden ruptures of high-pressure liquid or gas, which may lead to hazardous situations and great damage.

UT tools generate an acoustic wave which is transferred to the pipeline wall. With a certain orientation in which the acoustic wave is emitted, the wave can be used for conducting a wall thickness measurement to identify corrosion defects. UT tools may also be used for inspecting the pipeline for the presence of cracks. However, UT tools have limited application for the inspection of pipelines for gas, since the acoustic wave as generated by the UT tool generally requires a liquid as a coupling medium between the emitter and the substrate.

Techniques that employ electromagnetic acoustic transducers (EMAT) have been proposed, which allow for the detection of cracks in both liquid and gas pipelines. An EMAT generates an acoustic wave which interacts with defects in a pipeline if present. The transmitted or reflected wave is measured and analysed to detect the defect.

Known techniques employing EMAT technology are for example disclosed in US patent application US 2011/0167914 (US'914), U.S. Pat. No. 7,819,010 (US'010) and US patent application US 2011/041612 (US'612). The pipeline inspection tools according to US'914 and US'010 use EMATs that generate guided waves. However, the use of guided waves results in image data that have a relatively limited spatial resolution. The proposed method of US'612 employs horizontal shear waves and lamb waves and can be used to detect and identify all kinds of pipeline defects, but is not highly sensitive to cracks only. Furthermore, the pipeline inspection tools of at least US'914, US'010 cannot simultaneously detect cracks orientated in different directions, e.g. the circumferential direction and axial direction of the pipeline. Early and reliable detection of all kinds of cracks is however desirable. Furthermore, known EMAT pipeline inspection tools may be sensitive to reflected waves from laminations inside the pipe wall and at locations where the external coating is disbonded from the pipe wall. Such signals may be difficult to discriminate, thereby hindering the classification of cracks in acquired image data. Thus, above techniques that employ EMAT technology for the detection and classification of cracks in pipelines lack reliability, which is one of the main reasons why commercial EMAT tools found limited market acceptance so far.

Another pipeline inspection tool is disclosed in US patent application US 2014/028300 A1. The tool according to this disclosure is however not configured to classify cracks, but is rather designed to detect a wide range of defects that otherwise would have required a combination of different inspection methods using multiple different tools. Accordingly, several EMAT signals are separately and independently sampled and analysed to detect said wide range of defects.

US patent application U.S. Pat. No. 7,697,375 B2 relates to a tool employing EMAT technology for inspecting cement bonds in wellbores. This tool is however not configured to detect and classify cracks.

OBJECTS OF THE INVENTION

The present invention is concerned with pipeline inspection tools that are able to reliably detect and classify cracks in various directions in a pipeline.

SUMMARY OF THE INVENTION

In accordance with the teachings of the present disclosure, simultaneous detection and classification of different kinds of cracks in pipelines is possible, in particular longitudinal, axial and spiral cracks. Furthermore, the present teachings result in a method and apparatus for the detection and classification of cracks of any kind, while not or to a limited extend being sensitive to other kind of pipeline defects.

The present teachings are applicable to long-distance pipelines as well as short-distance pipelines.

In general, such detection and classification is achieved by means of a measurement protocol in which a first shear wave is generated and is emitted along a region of inspection in the pipeline. Said region may comprise a crack orientated in any direction, such as the axial or circumferential direction of the pipeline. The first shear wave is polarized in a first direction, such as a direction parallel to a crack orientation of interest (e.g. the axial or circumferential direction). A second shear wave is generated, which is polarized in a direction at a minimal angle of about 10° different from the first direction, preferably at an angle of about 30° or more, more preferably at an angle of about 45° or more, even more preferably at an angle of about 60° or more and most preferably at an angle of about 90°. The first and second shear waves are received for analysis, in which the anisotropy of the received waves is examined by comparing wave properties (amplitude, wavelength, frequency, phase) of said received waves. Such comparison can be achieved by computing a wave attenuation anisotropy factor. In other words, the anisotropy of the first and second received shear waves is examined by comparing at least one wave property of said first and second received shear waves, thereby allowing the detection and classification of cracks in the examined pipeline.

The first and second emitted shear waves can have a frequency between about 0.5 and 5 MHz.

Shear waves can for instance be generated by means of EMATs. The first and second shear wave can be generated and detected by a single EMAT. Alternatively, several different EMATs can be used for the generation and detection of the first and second shear wave.

According to a first embodiment, the first and second emitted shear waves are emitted in a direction substantially orthogonal to an inner wall surface of the pipeline. When EMAT technology is used for generating and detecting the shear waves, a single EMAT can be used to generate and detect the first and second shear waves. Alternatively, different EMATs can be used. For instance, a first EMAT generates and detects the first shear wave, while a second EMAT generates and detects the second shear wave.

When a single EMAT is used for generation and detection of the first and second shear wave, the EMAT is spatially rotated after generation and detection of the first shear wave, such that the second shear wave can be generated and detected.

According to a second embodiment, the first shear wave is emitted in an axial direction of the pipeline, and the second shear wave is emitted in a direction substantially circumferential to a wall of the pipeline. Each shear wave can be generated by a separate emitting EMAT, and each shear wave can be detected by a separate receiving EMAT which are different from the emitting EMATs.

In accordance with the teachings of the present disclosure, there is further provided an apparatus for detecting and classifying cracks in a pipeline, the apparatus comprising a first emitting EMAT for emitting a first shear wave along a region of inspection, the first shear wave being polarized in a first direction; a first receiving EMAT, for receiving the first shear wave; a second emitting EMAT, for emitting a second shear wave along the region of inspection, the second shear wave being polarized in a second direction at a minimal angle of about 10° different from the first direction; a second receiving EMAT, for receiving the second shear wave; an on-board or off-board processor unit for processing data from the first and second receiving EMATs, including examining the anisotropy of the first and second received shear waves by comparing at least one wave property of said first and second received shear wave for detecting and classifying cracks in the region of inspection.

Such an apparatus can be adapted to carry out the methods according to the teachings of the present disclosure.

In accordance with the teachings of the present disclosure, there is further provided a pipeline inspection tool comprising a pipeline vehicle; a sensor module mountable on the pipeline vehicle, comprising at least one apparatus according to the teachings of the present disclosure; at least one power source unit, for supplying energy to at least the sensor module.

Said pipeline inspection tool can be adapted to move in the pipeline along an axial direction of the pipeline, preferably at a speed of about 0.1-4 meter per second.

It will be appreciated that the principles and teachings according to the present disclosure can be used for detecting and classifying cracks. In particular, simultaneous detection and classification of longitudinal, axial and spiral cracks is possible.

It will be appreciated that, due to the context of this document, the wording "detecting cracks" includes the determination of the presence of cracks based on the acquired data. It will be further appreciated that, due to the context of this document, the wording "classifying cracks" includes the determination of the crack type (including size, orientation) based on the acquired data.

It will be further appreciated that, according to the embodiments as disclosed herein, horizontally polarized shear waves are used (also called "horizontal shear waves" or "SH-waves"), and are denoted herein as "shear wave(s)". That is, particles in the lattice of a material to be investigated are disturbed to oscillate in a plane parallel to the surface of the material to be investigated, e.g. the pipeline wall surface, while the disturbance propagates as a wave in a direction perpendicular to said plane.

Furthermore, although the disclosed exemplary embodiments employ EMAT technology, the skilled person understand that the teachings of the present disclosure are not confined to such technology. That is, any (future) generator that can generate shear waves in (gas) pipelines is suitable for performing the measurement protocol as disclosed herein. Moreover, the teachings of the present disclosure are not limited to the inspection of pipelines that transport water, oil or gas over long or short distances, but may be applied to other applications wherein metal pipes are used, including drilling wells.

BRIEF DESCRIPTION OF THE ACCOMPANYING DRAWINGS

The present invention is described with respect to exemplary embodiments thereof and reference is accordingly made to the drawings in which:

FIG. 2B shows an example of a circumferential crack in a pipeline;

FIG. 2C shows an example of an axial crack in a pipeline;

FIG. 2D shows an example of a circumferential crack and a crack colony of circumferential cracks in a pipeline;

FIG. 2E shows an example of an axial crack and a bundle of axial cracks in a pipeline;

FIG. 2F shows an example of a spiral crack in a pipeline;

Figure 4A:
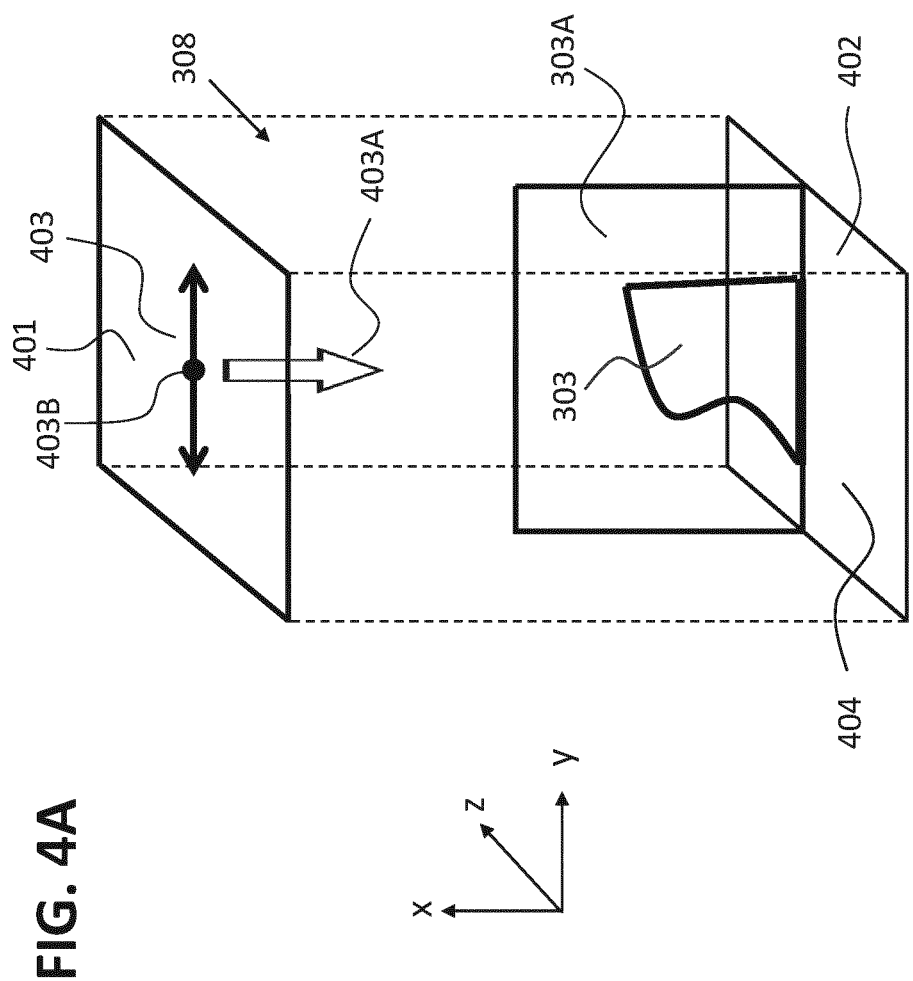
Figure 4B:
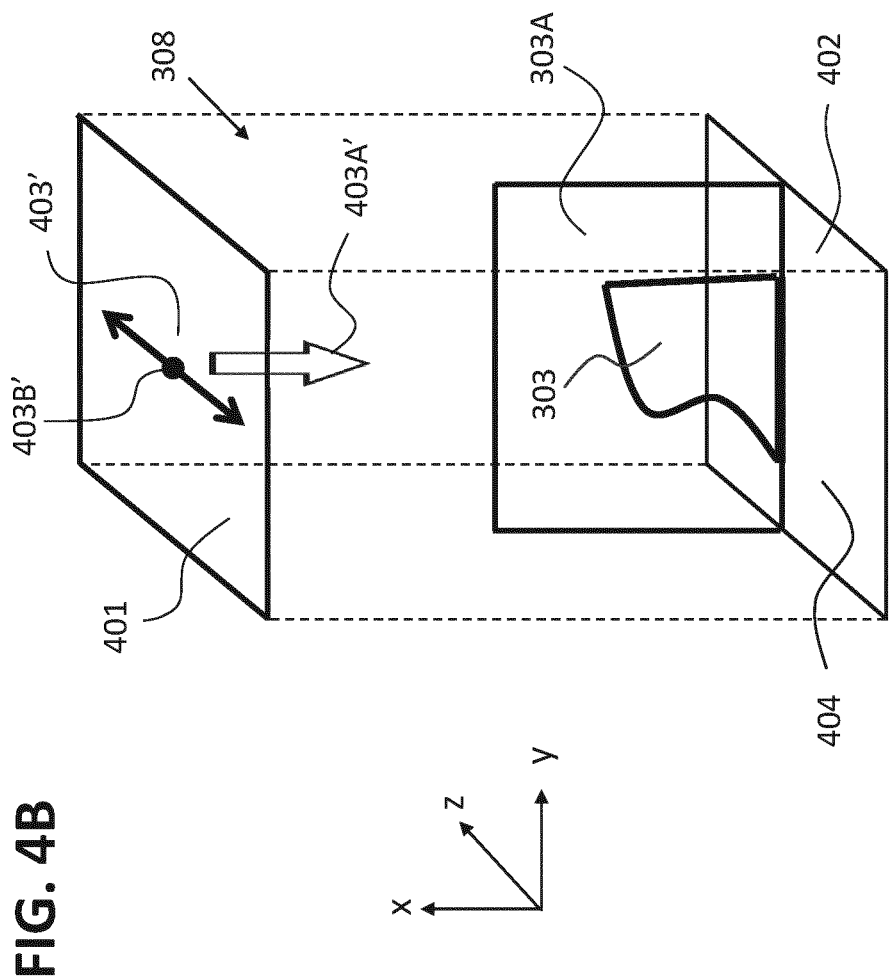
Figure 4C:
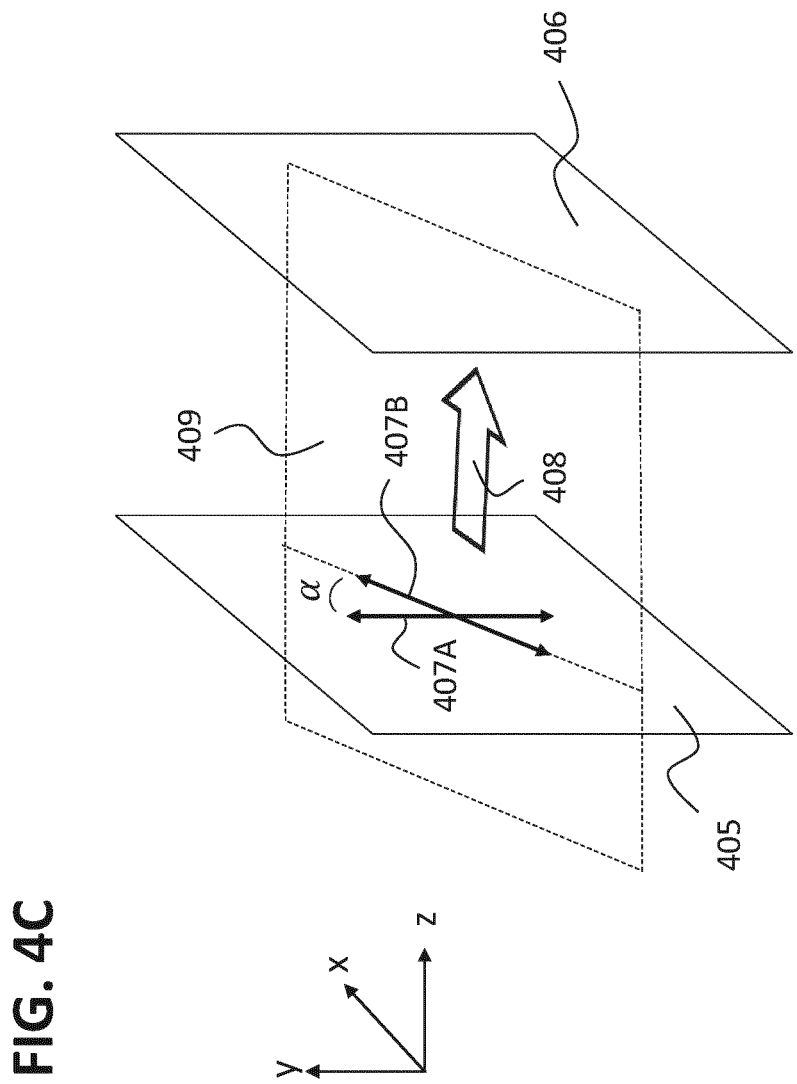
Figure 4D:
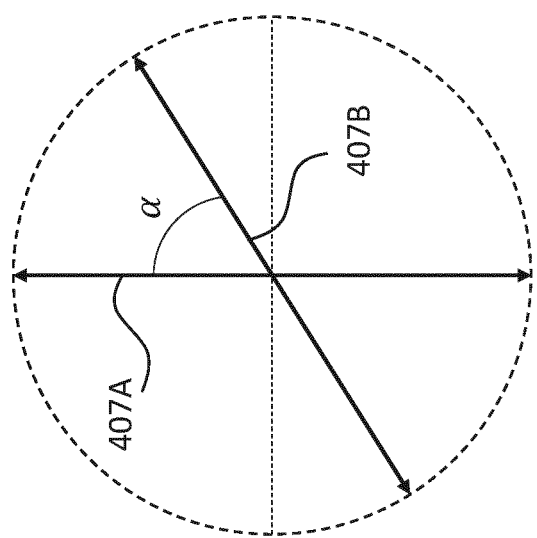
Figure 5:
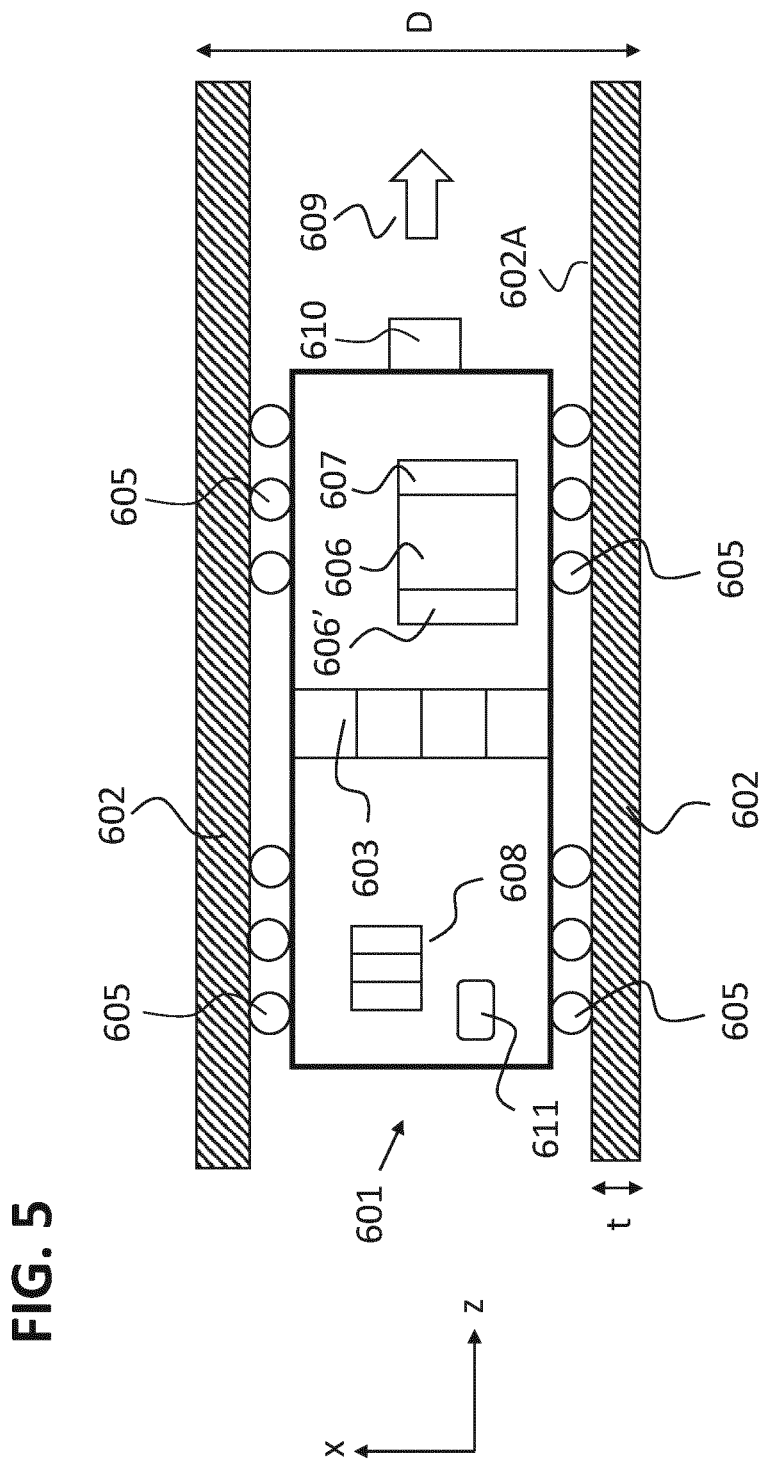

FIGS. 3A and 3B relate to a first embodiment as disclosed herein;

FIGS. 4A and 4B relate to a second embodiment as disclosed herein;

FIGS. 4C and 4D relate to an illustration of emitted shear waves that are polarized in generally different directions;

FIG. 5 schematically shows a pipeline inspection tool that travels through a pipeline with a certain speed.

DETAILED DESCRIPTION

It will be appreciated that for simplicity and clarity of illustration, where considered appropriate, reference numerals may be repeated among the figures to indicated corresponding or analogous elements or steps. In addition, numerous specific details are set forth in order to provide a thorough understanding of the embodiments described herein. However, it will be understood by those of ordinary skill in the art that the embodiments described herein may be practiced without these specific details. Furthermore, this description is not to be considered as limiting the scope of the embodiments described herein in any way, but rather as merely describing the implementation of the various embodiments described herein. Furthermore, it will be appreciated that, reference to similar features may be indicated by different reference signs in different figures as disclosed herein.

Figure 1A:
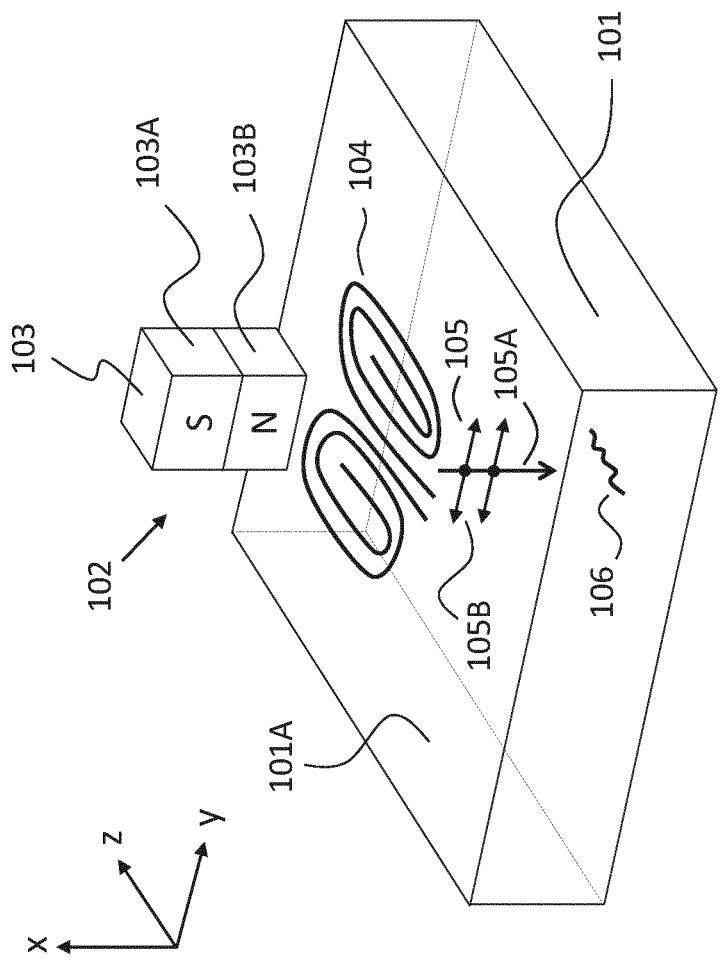
FIG. 1A shows an exemplary embodiment of an EMAT.

FIG. 1 shows a material 101 which is subject of investigation. Material 101 may be a conductive material and/or a ferromagnetic material. According to the embodiments as disclosed herein, material 101 may be a material from which a pipeline wall typically is made such as a metal, e.g. steel, carbon steel, or iron.

FIG. 1 further shows the main components of an exemplary electromagnetic acoustic transducer 102 (EMAT) nearby but not touching material 101. In general, an EMAT 102 comprises at least one electric coil 104 and at least one magnetic source 103. In the example of FIG. 1, the magnetic source 103 comprises a single permanent magnet, having a south pole 103A and a north pole 103B. Alternatively, the magnetic source 103 may comprise for example an electromagnet. Furthermore, FIG. 1 shows two spiral electrical coils 104, although the skilled person in the art will understand that an EMAT may comprise more or less coils, and other type of coils, for instance a coil having a meander or zig-zag like pattern, depending on the specific application. Coils 104 are typically RF coils through which a pulsed or smooth oscillating AC current is sent. According to the present invention, preferably ultrasonic waves are generated, preferably in the range of about 20 kHz to about 50 MHz, more preferably within the range of about 0.2 MHz to about 20 MHz, even more preferably within the range of about 0.5 MHz to about 5 MHz.

Although FIG. 1 shows an EMAT 102 having a single permanent magnet, the skilled person in the art will understand that an EMAT may comprise further adjacent permanent magnets, for instance a sequence of six magnets with alternating magnetic pole directions. Alternatively, EMAT 102 may comprise multiple electromagnets. Moreover, the skilled person understands that, depending on the specific application, different type of waves may be generated using different combinations of coils and magnetic sources. For instance, an EMAT may generate different kinds of ultrasound waves, including shear waves, surface waves such as so-called Rayleigh waves, and guided waves such as so-called Lamb waves. According to the present invention, the EMATs are designed to produce shear waves.

EMATs may be used for the generation of ultrasound in a conductive and/or ferromagnetic material such as a pipeline made from carbon steel. An advantage of using EMATs for the generation of ultrasound is that EMATs do not require a coupling medium, e.g. a liquid. EMATs therefore allow for the inspection of liquid as well as gas pipelines. In contrast, when using for example piezoelectric ultrasound transducers for the generation of ultrasound, physical contact (often through a liquid layer) of the transducer with the material to be investigated is in general required.

Referring to FIG. 1, in the case material 101 is a conductive material, the generation of a shear wave 105 in material 101 may rely on the following. An EMAT is brought near the surface 101A of the material 101. An RF current is sent through the coils 104, which induces Eddy currents in material 101 at and near surface 101A. The electrons of the Eddy currents experience a Lorentz force due to the magnetic field from the magnetic source 103. The direction of the magnetic field is thereby generated such that its direction is substantially orthogonal to the surface 101A. On a macroscopic level, particles at and near the surface 101A start oscillating in a direction 105B (the positive and negative y-direction), thereby causing neighbouring particles in the bulk to start oscillating in the same direction 105B. In this way, a distortion in the lattice is generated that propagates as an elastic wave 105 through the conductive material 101, in e.g. the direction 105A (the negative x-direction).

Detection of the ultrasonic wave 105 may be achieved by means of an inverse process. For instance, the generated ultrasonic wave may propagate to an area nearby a second, receiving EMAT (not shown), which induces Eddy currents and consequently an induction current in said receiving EMAT. Alternatively, the first, emitting EMAT is also the receiving EMAT. For instance, the detected ultrasonic wave may be a reflection from a defect in the material 101 or an echo from a wall of the material 101.

The ultrasonic wave 105 will interact with defects in the conductive material 101, e.g. crack 106. Analysis of the received ultrasonic wave can therefore indicate the presence of defects in the conductive material 101.

In the case material 101 is a ferromagnetic material, ultrasonic waves are generated through the mechanism of magnetostriction. That is, an RF current is sent through the coils 104 and produces magnetostriction at an ultrasonic frequency in the material 101. This generates an ultrasound wave 105 through the bulk of the material 101. Detection of the ultrasonic wave 105 can be achieved by means of an inverse process.

Usually, ferromagnetic material is also conductive. Steel is an example of a conductive ferromagnetic material. The skilled person will understand that the generation of ultrasonic waves in such materials usually results in enhanced signal generation.

Figure 2A:
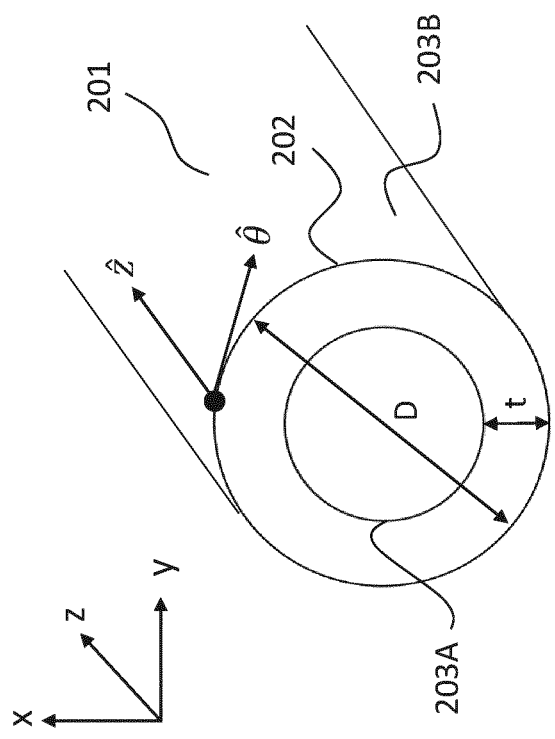
FIG. 2A shows a coordinate system that is adapted in further exemplary embodiments as disclosed herein.

Reference is now made to FIGS. 2A, 2B and 2C. FIG. 2A schematically shows a pipeline 201 having a diameter D, a wall thickness t and an outer boundary 202, in which a circumferential direction $\hat{\theta}$ and an axial direction $\hat{z}$ is indicated. Pipeline 201 has an inner wall 203A and an outer wall 203B. Directions as indicated within embodiments as disclosed herein will be referred to with respect to said system of coordinates.

FIGS. 2B and 2C show a cross section of a pipeline 203, wherein pipeline 203 has an inner wall 203A and an outer wall 203B. FIG. 2B shows an example of a circumferential crack 204 within a plane 204A aligned in the circumferential direction $\hat{\theta}$. FIG. 2C shows an example of an axial crack 204' within a plane 204A' aligned in the axial direction $\hat{z}$. It is noted that pipelines show often axial cracks, whereas welded joints within the pipeline may show circumferential cracks.

Referring to FIGS. 2D-F, a pipeline 203 is shown. FIG. 2D shows another example of a circumferential crack 204. Such cracks are typically found in welded joints. Furthermore, circumferential cracks are typically observed within bundles of multiple, circumferentially orientated cracks 204-1.

FIG. 2E shows another example of an axial crack 204'. Axial cracks are typically found in the pipeline material, and may start at the outer pipeline boundary and penetrate to a certain depth. Furthermore, such cracks are typically observed within bundles of multiple, axial orientated cracks 204-2.

FIG. 2F shows a pipe with a spiral weld 204" and represents another type of crack which is sometimes found in pipelines. This type of crack is known as a spiral crack. A spiral crack extends in the axial direction $\hat{z}$ while changing its direction in the circumferential direction $\hat{\theta}$. Spiral cracks can be present in pipes that comprise spiral welds. Such pipes are known as helically welded pipes or spiral welded pipes.

Reference is made to FIGS. 3A and 3B, which relate to the detection and classification of cracks in a pipeline 308.

A first emitting EMAT (not shown) such as an EMAT 101 as described in FIG. 1 is located within the pipeline 308 such that a first shear wave 304 polarized in a plane 301 parallel to a plane of interest comprising a region of inspection 303A is generated. That is, shear wave 304 is polarised in the direction 304B. The shear wave 304 propagates in a direction 304A towards the plane of interest comprising a region of inspection 303A. In the present case, region of inspection 303A comprises a crack 303 that is orientated parallel to said plane of interest. Due to this orientation, shear wave 304 will not or to a minimal extend interact with crack 303. The shear wave propagates further and is received by a first receiving EMAT such as an EMAT 101 as shown in FIG. 1. The first receiving EMAT is located in plane 302. Accordingly, a substantially undamped shear wave will be measured. The planes 301 and 302 may be distanced by a distance d1, which may be within a range of about 2 cm-250 cm, more preferably about 5 cm-50 cm.

As will be explained in more detail later, by examining the anisotropy of the received waves, crack 303 can be detected and classified. Hence, the presence of a crack can be determined, as well as information on the crack size and crack orientation (and therefore crack type, e.g. an axial crack, longitudinal crack or spiral crack).

A second emitting EMAT (not shown) such as an EMAT 101 as described in FIG. 1 is located within the pipeline 308 such that a second shear wave 307 polarized in a plane 305 parallel to the plane of interest comprising a region of inspection 303A is generated. That is, shear wave 307 is polarised in the direction 307B. The shear wave 307 propagates in a direction 307A towards the plane of interest comprising a region of inspection 303A. Due to the orientation of crack 303, shear wave 307 will interact with crack 303, for instance by (partial) conversion to other wave modes. The damped shear wave propagates further and is received by a second receiving EMAT such as an EMAT 101 as shown in FIG. 1. The second receiving EMAT is located in a plane 306. Accordingly, a substantially damped shear wave will be measured. The planes 305 and 306 may be distanced by a distance d2, which may be within a range of about 2 cm-250 cm, more preferably about 5 cm-50 cm.

In the present example, crack 303 is a circumferential crack, and the planes 301 and 302 are distanced in the axial direction with respect to one another, whereas the planes 305 and 306 are distanced in the circumferential direction with respect to one another.

Furthermore, the first shear wave 304 can be generated first, after which the second shear wave 307 is generated. However, the first and second shear waves may also be generated substantially at the same time, as long as interference can be avoided.

It is finally noted that the measurement protocol of the exemplary embodiment according to FIGS. 3A-B is very sensitive to the detection and classification of only cracks (of all kinds, e.g. circumferential, axial, spiral), while not being sensitive to other pipeline defects such as delaminations.

Reference is made to FIGS. 4A and 4B, which also relate to the detection and classification of cracks in a pipeline 308.

Accordingly, a first emitting EMAT such as an EMAT 101 as shown in FIG. 1 is located within the pipeline 308 such that a first shear wave 403 polarized in a plane 401 parallel to a plane of interest comprising a region of inspection 303A is generated. That is, shear wave 403 is polarised in the direction 403B. The shear wave 403 propagates in a direction 403A towards the plane of interest comprising a region of inspection 303A. In the present case, region of inspection 303A comprises a crack 303 that is orientated parallel to said plane of interest. Due to this orientation, shear wave 403 will not or to a minimal extend interact with crack 303. The shear wave propagates further, reflects at an outer wall 404 of pipeline 308, and is received as an echo signal by a first receiving EMAT (not shown) such as an EMAT 101 as described in FIG. 1. The first receiving EMAT is also located in plane 401. Accordingly, a substantially undamped shear wave will be measured. Alternatively, the echo signal may be received by the first emitting EMAT.

A second emitting EMAT such as an EMAT 101 as shown in FIG. 1 is located within the pipeline 308 such that a second shear wave 403' polarized in a plane 401 parallel to a plane of interest comprising a region of inspection 303A is generated. That is, shear wave 403' is polarised in the direction 403B'. The shear wave 403' propagates in a direction 403A' towards the plane of interest comprising a region of inspection 303A. In the present case, region of inspection 304A comprises a crack 303 that is orientated parallel to said plane of interest. Due to this orientation, shear wave 403' will interact with crack 303 for instance by (partial) conversion to other wave modes. The damped shear wave propagates further, reflects at an outer wall 404 of pipeline 308, is further damped due to further interaction with crack 303, and is finally received as an echo signal by a first receiving EMAT (not shown) such as an EMAT 101 as described in FIG. 1. The first receiving EMAT is also located in plane 401. Accordingly, a substantially damped shear wave will be measured. Alternatively, the echo signal may be received by the first emitting EMAT.

In the present example, crack 303 is circumferential crack, and the planes 401 and 402 are distanced in the circumferential direction with respect to one another. Thus, shear waves 403 and 403' propagates in a direction perpendicular to the pipeline wall 404.

Furthermore, the first shear wave 403 can be generated first, after which the second shear wave 403' is generated. However, the first and second shear waves may also be generated substantially at the same time.

It is further noted that the measurement protocol according to this exemplary embodiment may also employ just a single EMAT for both generating and receiving the first shear wave 403 and the second shear wave 403'. In this case, the EMAT changes its spatial orientation after the first shear wave 403 has been generated. For instance, the EMAT is rotated, preferably by an angle of about 90° (orthogonal). Smaller or larger angles may also be used, as will be described later when referring to FIGS. 4C and 4D of the present disclosure.

The two received shear waves as obtained by means according to the exemplary embodiments of FIG. 3A-B or FIGS. 4A-4B, may be analysed in order to determine whether the region of interest 303A comprises cracks. On top of this, if cracks are indeed present, the crack type can be determined as well.

Accordingly, by comparing the received shear waves, the presence of cracks can be determined. More specifically, if cracks are found, the cracks can be classified in size and orientation. Analysis can be performed by computation of a wave attenuation anisotropy factor ("WAAF"). Such analysis may for instance be achieved by taking a difference in measured amplitudes of the received waves. Alternatively, the WAAF can be computed by dividing the amplitude of the first received wave with the second received wave. Moreover, the skilled person understands that in general, any other wave property (e.g. frequency, wave length, phase) may be used for the computation of a WAAF.

In the following, an example of WAAF computation is discussed, wherein the WAAF is computed as a ratio of measured amplitudes of the first and second received shear wave. For instance, in the situation of FIGS. 3A-B, the first shear wave 304 is polarised in the direction 304B which is parallel to the crack orientation of crack 303. Here, the crack 303 is a circumferential crack. As discussed earlier, the first wave 304 is not or to a minimal extend damped by such a defect. A wave attenuation A of said first wave 304 as detected by an EMAT in plane 302 is therefore small. On the contrary, second shear wave 307 is polarised in a direction perpendicular to said crack orientation, and as discussed above, interacts with crack 303. A wave attenuation B of said second wave 307 as detected by an EMAT in a plane 306 is therefore large. A ratio A/B as WAAF may therefore be relatively small, e.g. much smaller than 1. In case no crack is present in the region of inspection 303A, the WAAF will be equal or close to 1. Furthermore, the skilled person will understand that, if crack 303 was in fact an axial crack, the wave attenuation A would be relatively large compared to wave attenuation B, and a WAAF much larger than 1 would be obtained. Moreover, the larger the absolute value of the WAAF, the larger the size of the crack. Thus, measurement protocol as illustrated in the exemplary embodiment of FIGS. 3A-B is simultaneously sensitive for all kind of cracks.

The same principles hold for the measurement protocol of FIGS. 4A-B. Here, the first shear wave 403 is polarised in the direction 403B which is parallel to the crack orientation of crack 303 (a circumferential crack). As discussed earlier, the wave is not or to a minimal extend damped by such a defect. A wave attenuation A' of said first wave 403 as detected by an EMAT in plane 401 is therefore small. On the contrary second shear wave 403' is polarised in a direction perpendicular to said crack orientation, and as discussed above, interacts with crack 303. A wave attenuation B' of said second wave 403' as detected by an EMAT in a plane 306 is therefore large. The ratio $$\frac{A'}{B'}$$

as WAAF may therefore be much smaller than 1. In case no crack is present in the region of inspection 303A, The WAAF will be equal or close to 1. Furthermore, the skilled person will understand that, if crack 303 was in fact an axial crack, the wave attenuation A' would be relatively large compared to wave attenuation B', and a WAAF much larger than 1 would be obtained. Moreover, the larger the absolute value of the WAAF, the larger the size of the crack. Thus, measurement protocol as described in accordance with the exemplary embodiment of FIGS. 4A-B is simultaneously sensitive for all kind of cracks.

Thus, the above illustrates that a WAAF value provides a user with reliable information on the detection and classification of cracks.

Moreover, it is noted the same teachings also provide for the detection of spiral cracks, even if these cracks are close to about 45°. In that case, a wave amplitude ratio as WAAF may be equal to or close to 1, but the wave attenuations A and B or A' and B' are not small. Alternatively, if EMATs are orientated with respect with one another at an angle (thus not aligned circumferential or axial, but rather orientated within a range of about 20° to 70°, more preferably about 30° to 60°) a WAAF as computed in a similar fashion as discussed above is relatively small for if the first emitted shear wave is polarised substantially parallel to the spiral crack, while the second emitted shear wave is polarised substantially perpendicular to the spiral crack.

It is further noted that in the examples above the terms "small" and "large" are used with respect to wave attenuations. The skilled person however understands that such terms are relative to the initial wave amplitude of emitted shear waves, or a situation where a wave experiences minimal attenuation because no defects are present.

Furthermore, the inventors of the present disclosure have found that the computed WAAF on the basis of measured shear waves according to the examples of FIG. 3A-B or 4A-B is a very sensitive measure for detection of cracks, while not being sensitive to other pipeline defects such as laminations inside the pipeline or a coating that is disbonded from the pipeline wall. Therefore, the WAAF corresponds to reliable information on the presence and type of cracks in pipelines.

As discussed above, a WAAF is therefore a sensitive tool for the simultaneously detection of different kinds of cracks, such as axial cracks, circumferential cracks and spiral cracks. For instance, if the region of inspection 303A would comprise an axial crack, the WAAF would be much greater than 1. As already mentioned above, other orientated cracks may also be detected using a similar approach. That is, a first shear wave is used that is substantially parallel to the crack orientation of interest, and a second shear wave makes an angle with said crack orientation of interest, preferably around 90° (orthogonal). It is further noted that pipelines show often axial cracks, whereas welded joints within the pipeline may show circumferential cracks. These crack types are therefore considered as the most relevant crack types.

Furthermore, the above disclosed examples assumed first and second emitted waves that are orientated substantially orthogonal to one another. However, the skilled person may understand that the first and second emitted wave may be polarised with respect to one another at an angle different than around 90°. This is illustrated in FIGS. 4C and 4D. Accordingly, two shear waves emitted in direction 408 are shown, where a first shear wave has a polarization in a direction 407A and a second shear wave has a polarization in a direction 407B. Here, the first shear wave is polarized in a plane 405, which is parallel to a plane 406 (e.g. the plane comprising a crack with that is orientated parallel to said plane 406). In the present example, the planes 405 and 406 are parallel to the xy-planes. The second shear wave is polarized in a plane 409 that is orthogonal to plane 405, and further makes an angle α with said plane 405 as indicated in FIG. 4C. For clarity, the shear waves in the xy-plane are shown in FIG. 4B. Angle α generally will be at least around 10°. Preferably, angle α is larger than about 30° More preferably, angle α is larger than about 45°. Most preferably however, angle α is around 90°. Furthermore, it will be appreciated that further emitted waves may be used, such as a third and fourth emitted waves. All waves can be polarised in a different orientation. For instance, in case of 3 emitted waves, the first and second wave may be polarised as illustrated in FIGS. 4C and 4D. A third wave can be polarised in the same plane as the first and second emitted wave, but at an angle different from $\alpha$, for instance $2\alpha$. In another preferred embodiment three waves are used, at an angle of about 60°. Thereby, all cracks can be analysed using a WAAF. However, it can be appreciated that the use of 2 emitted waves which are substantially orthogonal with respect to one another is mostly preferred.

Reference is made to FIG. 5, which shows a schematic exemplary pipeline inspection tool 601 within a pipeline 602 with a diameter D, a wall thickness t, and an inner wall 602A. The pipeline 602 may be a pipeline with a diameter of about 5 centimetre to about 5 meter, more preferably about 8 centimetre to about 1.5 meter and a thickness t of about 1 to about 100 mm, more preferably about 2 mm to about 60 mm, even more preferably about 5 mm to about 30 mm. The skilled person however understands that diameter D and wall thickness t may be smaller or larger. Furthermore, the pipeline may be a short-distance (pipelines of a couple of 100 meters such as loading or riser pipes, e.g. as used offshore) or long-distance pipeline (km long pipelines).

Tool 601 comprises a sensor module 603 comprising several EMATs such as an EMAT 102 as described in FIG. 1. Each EMAT is configured to generate ultrasonic waves in the pipeline 602 according to any of the teachings as discussed above. Preferably, the sensor module 603 comprises a sufficient number of EMATs, such that the pipeline 602 may be sufficiently measured. Alternatively, sensor module 603 comprises at least one EMAT which circumferentially scans the pipeline. However, such a scanning configuration acquires data at a much slower rate. Therefore, such scanning configuration may be applied for the inspection of short-distance pipelines.

The sensor module 603 allows to measure a wall coverage of at least about 45% in one pass, more preferably about 80% or more, even more preferably about 90% or more, even more preferably about 95% or more and most preferably about 100%. The tool 601 comprises guiding means 605 such as disks, wheels, brushes or electromagnetic guiding means, such that the tool 601 may scan the pipeline for cracks while moving in the direction 609 (the axial direction, here: positive z-direction).

Furthermore, tool 601 comprises one or more processor units 606 for the processing of data from the sensor module 603, and a data storage 606' for at least the storage of processed data, although unprocessed data may also be stored. Tool 601 may further comprise cooling means 607, to prevent overheating of the one or more processor units 606.

The one or more processor units 606 are configured to carry out the examination of the anisotropy of measured signals, by means of executing a WAAF computation algorithm. Processor units 606 may also carry out noise reduction algorithms. Furthermore, it will be appreciated that the one or more processor units 606 and data storage 606' may not be integrated within tool 601, but are off-board elements. That is, tool 601 can be in connection with off-board processor and data storage, by means of for example a suitable data cable. In particular, such an embodiment may find application in the inspection of small-distance pipelines.

Tool 601 may be supplied by one or more power source units 608 such as batteries, such that, for example, sensor module 603 is provided with sufficient power during a run.

During a run, tool 601 moves along the inner walls of the pipeline 602 along the direction 609, at a relatively high constant speed, preferably of about 0.1 meter to about 4 meter per second. The skilled person however understands that tool 601 may also move at faster (preferably about 5 meter per second to about 20 meter per second) or slower speeds (preferably about 0.01 meter per second to about 0.09 meter per second). The speed of the tool 601 may depend on the type of application. That is, the speed of tool 601 may be about 100 meter per 10 hours for short-distance pipelines. The speed of tool 601 for large-distance pipelines may be much greater, preferably about 0.1 meter per second to about 10 meter per second. The speed of tool 601 can be regulated by means of a speed control unit 610. Furthermore, the distance travelled by tool 601 can be measured by means of an odometer 611.

The RF signal that is sent through the electric coils is preferably within the range about 0.5 MHz to about 5 MHz. RF signals may be applied for a period of about 100 ns to about 300 ns, although shorter (e.g. about 50 ns) or longer periods may also be possible, but not longer than about 1 µs. Furthermore, RF pulse repetition are provided preferably at a frequency within about 100 Hz to about 2 kHz. The skilled person however understands that such parameters of the sensor module 603 may be adapted to the scan speed of the tool 601, such that the complete pipeline 602 can be inspected for cracks.

Having described exemplary embodiments, it can be appreciated that the above specific embodiments are illustrative, and variations can be introduced on these embodiments without departing from the spirit of the disclosure or from the scope of the appended claims.

The invention claimed is:

1. A method for detecting and classifying cracks in a pipeline, the method comprising the steps of:
   emitting a first shear wave along a region of inspection, the first shear wave being polarized in a first direction;
   receiving the first shear wave;
   emitting a second shear wave along the region of inspection, the second shear wave being polarized in a second direction at a minimal angle of about 10° different from the first direction;
   receiving the second shear wave;
   examining the anisotropy of the first and second received shear waves by comparing at least one wave property of said first and second received shear waves for detecting and classifying cracks in the region of inspection of the pipeline.

2. The method of claim 1, wherein the first shear wave is emitted using a first emitting electromagnetic acoustic transducer, wherein the first shear wave is received using a first receiving electromagnetic acoustic transducer, wherein the second shear wave is emitted using a second emitting electromagnetic acoustic transducer, and wherein the second shear wave is received using a second receiving electromagnetic acoustic transducer.

3. The method according to claim 1, wherein the first and second emitted shear waves are emitted in a direction substantially orthogonal to an inner wall surface of the pipeline.

4. The method according to claim 2, wherein the first receiving electromagnetic acoustic transducer is the same electromagnetic acoustic transducer as the first emitting electromagnetic acoustic transducer and/or wherein the second receiving electromagnetic acoustic transducer is the same electromagnetic acoustic transducer as the second emitting electromagnetic acoustic transducer.

5. The method according to claim 2, wherein the first and second emitting electromagnetic acoustic transducer, and the first and second receiving electromagnetic acoustic transducer are all the same electromagnetic acoustic transducer, and wherein the electromagnetic acoustic transducer is configured to rotate after the first shear wave is received, and to subsequently emit the second shear wave.

6. The method according to claim 1, wherein the first shear wave is emitted in an axial direction of the pipeline, and the second shear wave is emitted in a direction substantially circumferential to a wall of the pipeline.

7. The method according to claim 1, wherein the first direction is substantially parallel to an axial direction of the pipeline, and wherein the second direction is substantially parallel to the circumferential direction of the pipeline.

8. The method according to claim 1, wherein the step of examining the anisotropy of the first and second received shear waves includes the computation of a wave attenuation anisotropy factor.

9. The method according to claim 1, wherein the first and second emitted shear waves have a frequency between about 0.5 and 5 MHz.

10. The method according to claim 1, wherein the second direction is substantially orthogonal to the first direction.

11. The method according to claim 1, wherein the pipeline has a diameter of 8 cm to 1.5 m, and a wall thickness of 5 mm to 30 mm.

12. An apparatus for detecting and classifying cracks in a pipeline, the apparatus comprising:
a first emitting electromagnetic acoustic transducer for emitting a first shear wave along a region of inspection, the first shear wave being polarized in a first direction;
a first receiving electromagnetic acoustic transducer, for receiving the first shear wave;
a second emitting electromagnetic acoustic transducer, for emitting a second shear wave along the region of inspection, the second shear wave being polarized in a second direction at a minimal angle of about 10° different from the first direction;
a second receiving electromagnetic acoustic transducer, for receiving the second shear wave;
an on-board or off-board processor unit for processing data from the first and second receiving electromagnetic acoustic transducers, including examining the anisotropy of the first and second received shear waves by comparing at least one wave property of said first and second received shear wave for detecting and classifying cracks in the region of inspection.

13. The apparatus of claim 12, wherein the apparatus is adapted to carry out a method comprising the steps of:
emitting a first shear wave along a region of inspection, the first shear wave being polarized in a first direction;
receiving the first shear wave;
emitting a second shear wave along the region of inspection, the second shear wave being polarized in a second direction at a minimal angle of about 10° different from the first direction;
receiving the second shear wave;
examining the anisotropy of the first and second received shear waves by comparing at least one wave property of said first and second received shear waves for detecting and classifying cracks in the region of inspection of the pipeline.

14. A pipeline inspection tool comprising:
a pipeline vehicle;
a sensor module mountable on the pipeline vehicle, comprising at least one apparatus according to claim 12;
at least one power source unit, for supplying energy to at least the sensor module.

15. The pipeline inspection tool of claim 14, wherein the pipeline inspection tool further comprises a speed control unit adapted to move the pipeline inspection tool in the pipeline along an axial direction of the pipeline, at a speed of about 0.1-4 meter per second.

16. The method according to claim 1, wherein the second emitted shear wave is polarized in a second direction at an angle of about 30° or more different from the first direction.

17. The method according to claim 9, wherein the first and second emitted shear waves are applied for a period of 100 ns to 300 ns.

18. The method according to claim 9, wherein the first and second emitted shear waves are applied with a pulse repetition at a frequency within 100 Hz to 2 kHz.

19. The apparatus of claim 12 wherein the second emitted shear wave is polarized in a second direction at an angle of about 30° or more different from the first direction.

* * * * *